J. W. SALLADAY.
VEHICLE WHEEL.
APPLICATION FILED OCT. 5, 1908.
955,440.
Patented Apr. 19, 1910.
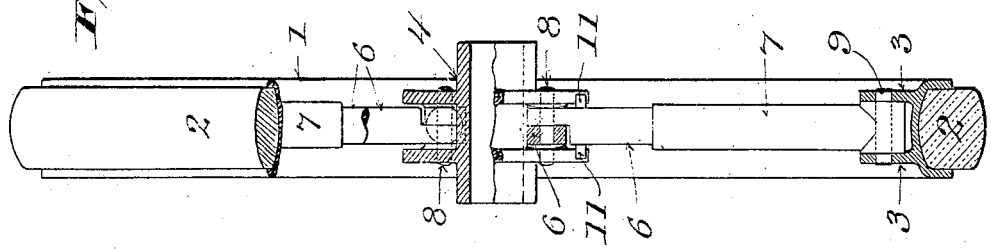
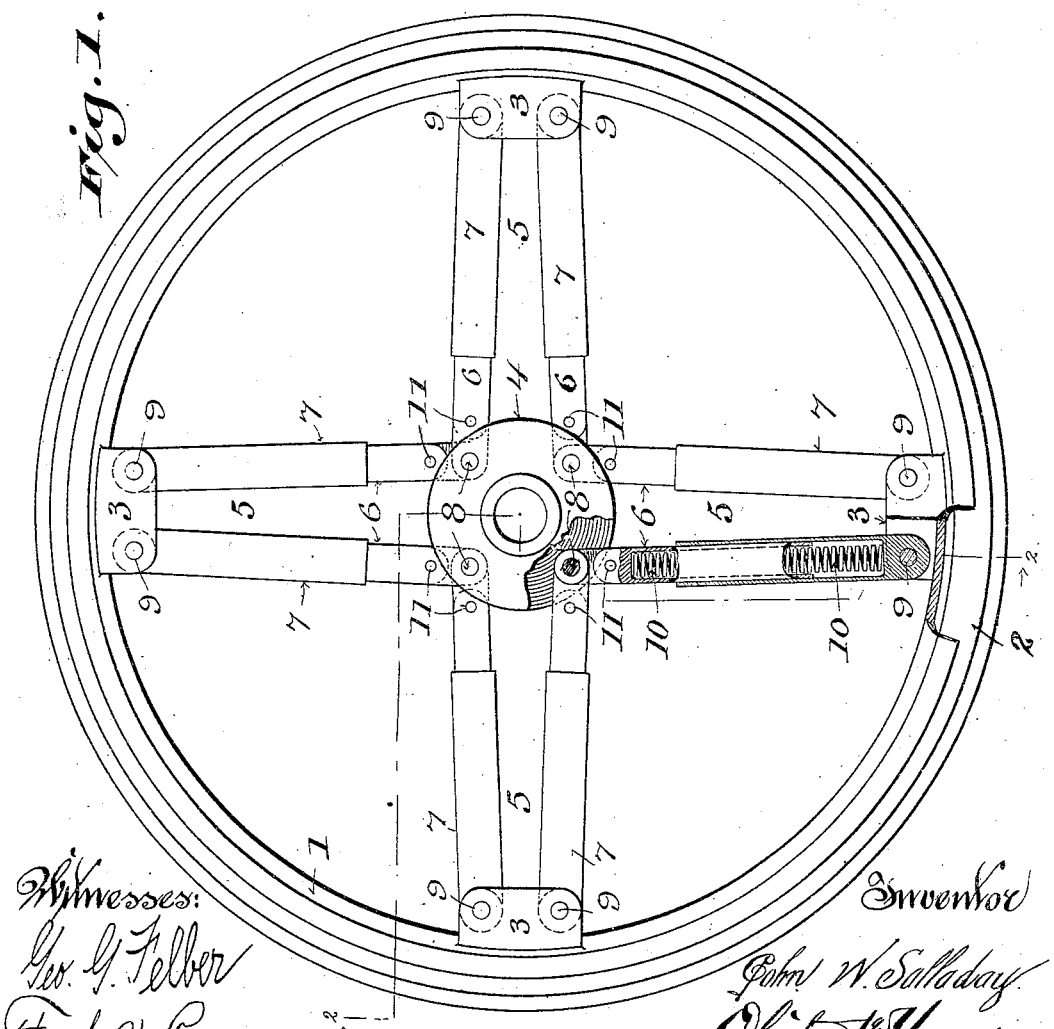

UNITED STATES PATENT OFFICE.

JOHN W. SALLADAY, OF MILWAUKEE, WISCONSIN, ASSIGNOR OF ONE-FOURTH TO HIRAM J. CARPENTER AND ONE-FOURTH TO CHARLES C. DIXON, BOTH OF REWEY, IOWA.

VEHICLE-WHEEL.

955,440.  Specification of Letters Patent.  Patented Apr. 19, 1910.

Application filed October 5, 1908. Serial No. 456,138.

*To all whom it may concern:*

Be it known that I, JOHN W. SALLADAY, a citizen of the United States, and resident of Milwaukee, in the county of Milwaukee and State of Wisconsin, have invented certain new and useful Improvements in Vehicle-Wheels; and I do hereby declare that the following is a full, clear, and exact description thereof.

The object of my invention is to provide a vehicle-wheel, the tire of which is capable of yielding with relation to its hub, the yield being effected by a series of spring-controlled telescopic spokes, whereby a resiliency is obtained similar to that in a pneumatic-tired wheel.

The invention therefore consists in various details of construction and combination of parts as hereinafter described with reference to the accompanying drawings and subsequently claimed.

In the drawings: Figure 1 represents a side elevation of a wheel embodying the features of my invention, with parts broken away and parts in section to better illustrate the details, and Fig. 2, a face view of the same partly in section as indicated by line 2—2 of the preceding figure.

Referring by numerals to the drawings, 1 indicates a metallic U-shaped wheel-rim provided with a solid rubber-tread 2, the rim being formed with series of pairs of ears 3 located equidistant apart throughout its circumference. A double annular flanged hub 4 is suspended within the wheel-rim by spring-controlled spokes 5 grouped in pairs and in connection with the rim.

Each spoke consists of tubular members 6, 7, respectively, the upper or hub member 6 being connected to the hub 4 by means of a pin 8, which pin passes through the head of said member 6 and the flanges of said hub. The lower or rim-member 7 of the spoke has its head pivoted between the ear 3 by a pin 9. The upper member 6 telescopes within the lower member, and a coil-spring 10 is fitted within the members under a normal compression, the ends of the coil-spring being adapted to seat against the heads of the respective members, as best shown in Fig. 1. The head of each member 6 is reduced in thickness from the body-portion thereof to permit the head of the adjacent member 6 of the next pair of spokes being inserted upon the same pin 8, while the lower members 7 of all spokes have independent pins grouped in pairs between the rim ears 3 as shown, each pair of spokes being arranged to have a slight convergence toward the rim.

In order to prevent the hub from twisting about its axis when the wheel is subjected to strain, caused either by being driven or revolving loosely upon an axle, I have provided a series of transverse locking pins 11, each of which is secured to the head of members 6 and projects therefrom so as to engage the annular surfaces of hub flanges. By this construction should the hub tend to twist upon any one of the spoke pins 8 as said hub assumes an eccentric position with relation to the wheel-rim, the locking pins 11 would cause a bind due to the flanges coming in contact therewith.

While I have shown the wheel provided with four sets of spokes it is understood that the number may be varied to suit the requirements, it being obvious that should the wheel-rim strike an obstruction, it would readily yield regardless of the position of the spokes with relation to said obstruction.

As shown, the coil-springs are placed within the hollow spokes in order to protect said springs from dust or moisture.

While I have shown the rim provided with a rubber tread, it is understood that any suitable tread material may be substituted therefor without departing from the spirit of my invention.

I claim:

A vehicle-wheel comprising a rigid rim, an annular flanged hub, hub spoke-members in pivotal connection with the hub flanges, other spoke members in pivotal connection with the rim, the spoke members of the hub and rim being in telescopic-engagement with each other, coil-springs interposed between the telescopic spoke-members, and transversely disposed locking-pins extending from the hub spoke-members, the locking-pins being adapted to engage with the hub flanges, whereby twist of the latter is resisted.

In testimony that I claim the foregoing I have hereunto set my hand at Milwaukee, in the county of Milwaukee and State of Wisconsin in the presence of two witnesses.

JOHN W. SALLADAY.

Witnesses:
GEO. G. FELBER,
N. E. OLIPHANT.

It is hereby certified that the residence of the assignee in Letters Patent No. 955,440, granted April 19, 1910, upon the application of John W. Salladay, of Milwaukee, Wisconsin, for an improvement in "Vehicle-Wheels," was erroneously written and printed "Rewey, Iowa," whereas said residence should have been written and printed *Rewey, Wisconsin;* and that the said Letters Patent should be read with this correction therein that the same may conform to the record of the case in the Patent Office.

Signed and sealed this 10th day of May, A. D., 1910.

[SEAL.]

C. C. BILLINGS,
*Acting Commissioner of Patents.*